United States Patent [19]
Polidor

[11] 3,790,233
[45] Feb. 5, 1974

[54] ANTIFRICTION SLIDE ASSEMBLY

[75] Inventor: Edward C. Polidor, Rochester, N.Y.

[73] Assignee: Automation Gages, Incorporated, Rochester, N.Y.

[22] Filed: Nov. 10, 1971

[21] Appl. No.: 197,313

[52] U.S. Cl. .................................. 308/6 R, 308/216
[51] Int. Cl. ............................................. F16c 21/00
[58] Field of Search ............. 308/3.8, 6 R, 3 A, 216

[56] References Cited
UNITED STATES PATENTS

| | | | |
|---|---|---|---|
| 3,361,500 | 1/1968 | Pohler | 308/216 |
| 3,113,807 | 12/1963 | Polidor | 308/6 R |
| 2,196,605 | 4/1940 | Johnson et al. | 308/6 R |
| 2,549,356 | 4/1951 | Zalkind | 308/215 |
| 3,145,065 | 8/1964 | Cator | 308/6 R |
| 2,929,661 | 3/1960 | Brown | 308/6 C |
| 3,044,835 | 7/1962 | Hurd | 308/6 C |
| 2,672,378 | 3/1954 | McVey | 308/6 C |
| 3,236,569 | 2/1966 | Moosmann | 308/6 R |

FOREIGN PATENTS OR APPLICATIONS

| | | | |
|---|---|---|---|
| 181,156 | 12/1921 | Great Britain | |
| 1,331,533 | 5/1962 | France | 308/6 C |

Primary Examiner—Charles J. Myhre
Assistant Examiner—R. H. Lazarus
Attorney, Agent, or Firm—Shlesinger, Fitzsimmons & Shlesinger

[57] ABSTRACT

This antifriction slide assembly comprises two members slidable relative to one another and mounted on roller bearings which roll on the flat surfaces of diagonally opposite rods mounted in confronting grooves of the two members. Alternate rollers are disposed so that their axes are inclined in opposite directions; and all the rollers are hollow. Pre-load on the rollers is achieved by longitudinal adjustment of a wedge member that contacts the pair of rods in a groove of one member.

1 Claim, 4 Drawing Figures

PATENTED FEB 5 1974　　　　　　　　　　　　　3,790,233

INVENTOR.
EDWARD C. POLIDOR
BY
Shlesinger, Fitzsimmons & Shlesinger
ATTORNEYS

ANTIFRICTION SLIDE ASSEMBLY

The present invention relates to antifriction slides designed for linear motion, and more particularly to roller slides intended for use on precision instruments and apparatus.

A primary object of the present invention is to provide an antifriction slide assembly for use in carrying heavy axial loads.

Another object of the invention is to provide an antifriction slide assembly employing roller bearings and in which the pre-load may be adjusted relatively simply and quickly both after final assembly, to compensate for manufacturing tolerances, and also for wear after use.

Another object of the invention is to provide a roller bearing linear slide assembly in which the rollers will roll very smoothly while insuring accuracy of travel.

Still another object of the invention is to provide a roller bearing slide assembly in which the rollers are made with minimum weight for inertia considerations and to insure equalization of the load on all the rollers.

Other objects of the invention will be apparent hereinafter from the specification and from the recital of the appended claims, particularly when read in conjunction with the accompanying drawing.

Figure 1:
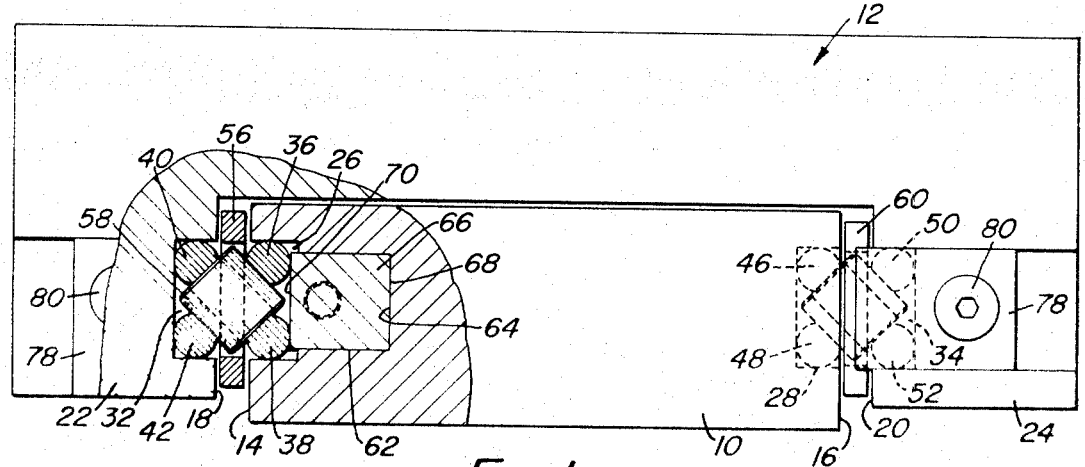
FIG. 1 is an end elevation, partly broken away, of a roller slide made according to a presently preferred embodiment of the invention.
Figure 2:
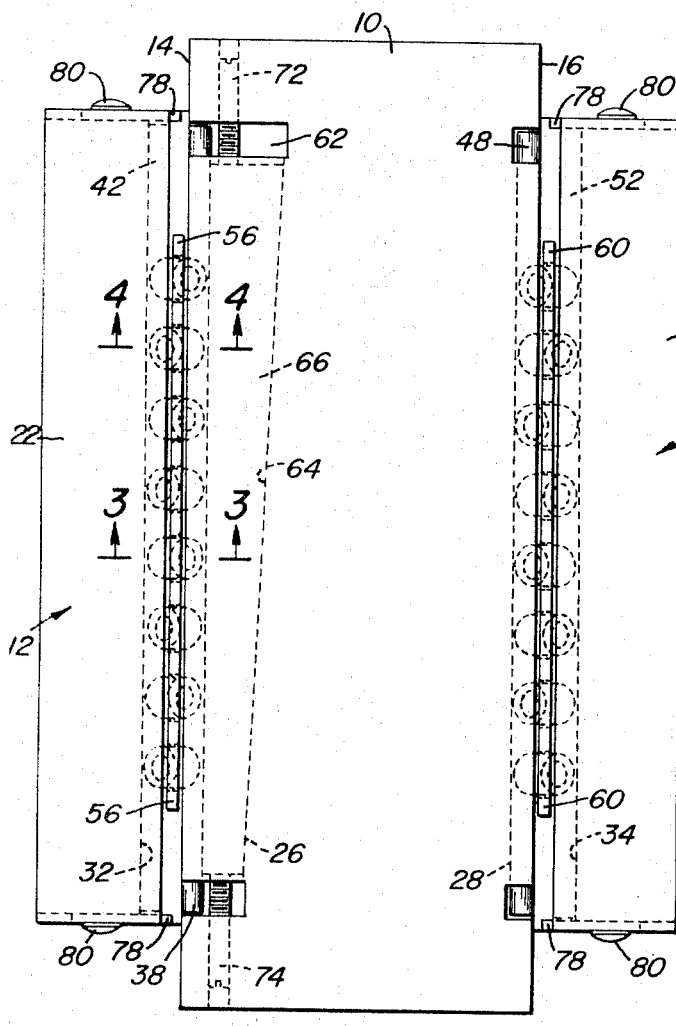
FIG. 2 is a plan view of this slide.

The present invention relates primarily to roller bearing slides in which flattened rods form the races for the rollers; and these rods are mounted in confronting channels or grooves formed in the two relatively slidable parts. One of the two relatively slidable parts may be a female type member straddling the other slidable part. There will then be two sets of raceways and two sets of roller bearings for supporting one slidable member on the other. The roller bearings may be pre-loaded by a tapered gib, the outer surface of which faces, and is parallel to the line of travel of the rollers; and the inside surface of which is inclined relative to its outer surface at a relatively small angle and seats against a similarly inclined surface formed in the bottom of a slot on the male member that communicates with one of the grooves in that member. Screws are provided for controllably adjusting the gib longitudinally, thereby to effect relatively small changes in the lateral position of its outwardly facing surface to adjust the pre-load.

Referring now to the drawing by numerals of reference, 10 denotes a tongue or slide, and 12 a yoke or female member which is supported on the tongue for smooth reciprocating translation. The slide member 12 straddles the tongue 10; and the outwardly facing parallel longitudinal sides 14 and 16 of the tongue are disposed between the inwardly facing parallel longitudinal sides 18 and 20 of the furcations 22 and 24 of the slide member 12.

The opposite sides 14 and 16 of the tongue 10 are grooved longitudinally as denoted at 26 and 28, respectively; and the confronting sides 18 and 20 of the yoke member 12 have grooves 32 and 34, respectively, in their furcations 22 and 24, respectively, which confront the grooves 26 and 28 of the slide member 10.

Mounted in the two corners of the groove 26 of slide member 10 are two longitudinally extending rods 36 and 38; and mounted in the opposite corners of the groove 32 of the slide member 12 are two similar rods 40 and 42. All these rods are flattened on their inner sides, as denoted at 44, for instance.

Similarly, two flattened rods 46 and 48 are mounted in the corners of the groove 28 of the slide member 10, and flattened rods 50 and 52 are mounted in the corners of the groove 34 of the furcation 24 of the yoke member 12.

A keeper or cage 56 supports a plurality of rollers 58 between the rods 36, 40, 38, 42. Similarly a keeper 60 supports rollers 58 between the rods 46, 50, 48, 52.

Figure 3:
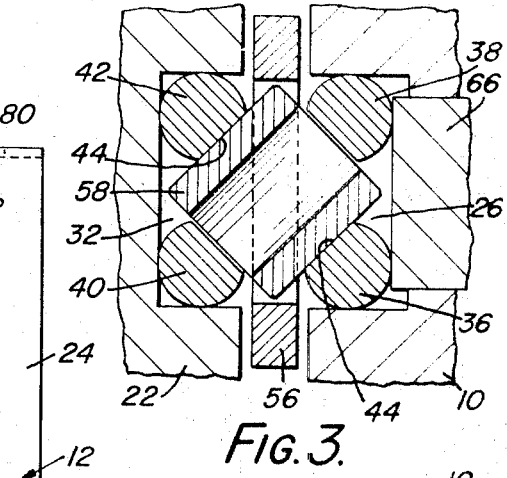
FIG. 3 is a section on a somewhat enlarged scale on the line 3—3 of FIG. 2 looking in the direction of the arrows.
Figure 4:
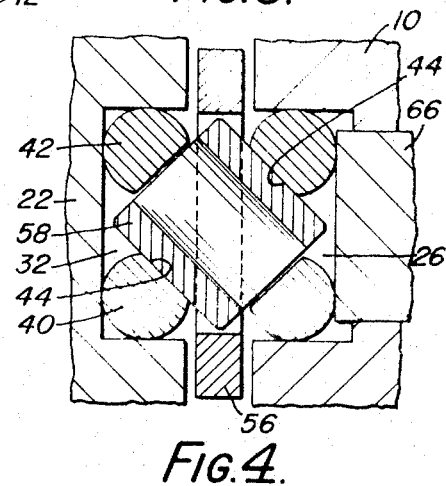
FIG. 4 is a similar sectional view taken on the line 4—4 of FIG. 2.

The rollers are cylindrical and have plane end surfaces perpendicular to their axes. Alternate rollers 58 in a race are oppositely directed, that is, their axes cross. The periphery of one roller 58, for instance, bears on the diagonally opposite rods 38 and 40 of confronting grooves 26, 32; whereas the periphery of the next roller 58 in the race bears on the diagonally opposite rods 36 and 42, as shown in FIGS. 3 and 4.

One feature of the invention is that the rollers 58 are hollow. Such rollers run smoother. They have a shell effect, and their reaction is better than solid rollers both in the sense of manufacture and in the sense that they have less weight and have some flexibility so that all the rollers will bear the load.

The rollers contact peripherally on diagonally opposite rods of confronting grooves 26, 32 and 28, 34 but their length is such that they have clearance at their ends with reference to the rods which are opposed to their ends.

The only members which require to be hardened are the rods and the rollers.

One of the grooves in one of the slide members has a slot, such as denoted at 62, communicating with this groove 26. This slot has an inclined bottom surface 64; and mounted in this slot is a tapered gib 66 which is longitudinally adjustable in the slot, and which provides lateral support for the rods 36 and 38. The gib 66 extends longitudinally along slightly less than the full length of the rods 36, 38 to allow for adjustment of the gib. The slope of the surface 64 of the slot matches the inclination of the inside surface 68 of the gib so that the outwardly facing surface 70 of the gib is parallel to the direction of adjustment of the gib and the movement of the slides. The gib 66 is adjustable by a pair of screws 72, 74, which are threaded in opposite ends of the slide member 10 and extend into the slot 62 to abut against the opposite ends of the gib, holding it firmly but adjustably in place. Since the pre-load adjustment requires only relatively small lateral movement of the rods 36, 38 to bring about only a relatively small change in the pre-load, the wedge angle of the gib 66 is made relatively small, say about 1° to 2° so that fine adjustments may readily be accomplished.

With the adjusting means of the present invention the pre-load on both roller races can be adjusted simultaneously and by adjustment of a single member, the gib 66. Moreover, this adjustment can be made very precisely. In this construction, the outer surface 70 of the gib 66 remains always parallel with the direction of travel of the slide 10, 12, thus eliminating alignment problems during adjustment. In addition, the pre-load adjustment can be made after final assembly, without need to disassemble the roller slide in any respect.

With hardened ways and cross rollers, nearly perfect mounting is required to assure line contact of the rollers with the ways. Even the very slightest misalignment in assembly, or careless preparation of the mounting surface, produces undesirable contact conditions. The hollow rollers 58, however, lend themselves to some flexibility so that they adjust and compensate automatically for any slight variation in manufacture or assembly of the rods. The wedge pre-loading allows the flattened rod guideways to rotate at will until perfect line contact is assured.

Plates 78, which are secured to opposite ends of the furcations 22 and 24 by screws 80, retain the rods in the assembly.

The hollow rollers reduce the weight of the assembly and therefore the inertia of the reciprocating member. Moreover, since the rollers are, in effect, shells they are flexible and accommodate themselves to variations in the confronting surfaces of the slide member and to unevenness or error in the grooves, and guide-ways in which the rollers are mounted.

While the invention has been described in connection with a specific embodiment, it will be understood that it is capable of further modification; and this application is intended to cover any embodiments of the invention that come within its scope or the limits of the appended claims.

Having thus described my invention, what I claim is:

1. An antifriction slide assembly comprising
a first member having outwardly facing, longitudinally extending grooves at opposite sides thereof, a second member straddling said first member and having a pair of inwardly-facing grooves confronting said outwardly facing grooves,
two elongate, parallel bearing rods disposed, respectively, in the upper and lower corners of each groove, each bearing rod being flat on its inner side,
the flat surface of a rod in the upper corner of a groove being disposed diagonally opposite the flat surface of the rod in the lower corner of the other groove,
a plurality of hollow, cylindrical rollers having plane end surfaces perpendicular to their axial center lines, and disposed between the four bearing rods of each pair of confronting grooves for supportingly connecting said members for rectilinear relative translation of said members,
a retainer disposed between said confronting grooves and disposed longitudinally thereof and in which said rollers are rotatably mounted in longitudinally spaced relation,
said rollers being disposed so that the cylindrical surface of each contacts the flat surfaces of one pair of two diagonally opposite rods in a pair of confronting grooves, so that the ends of each roller are spaced from the flat surfaces of the other pair of diagonally opposite rods in the same pair of confronting grooves, and so that the axes of alternate rollers between each pair of confronting grooves extend at an angle to each other,
means for controllably adjusting the depthwise positions of the rods in one of said grooves to adjust the pre-load on the rollers,
said adjusting means including a tapered gib disposed in a slot in one of said members which opens into said one groove and which extends generally in the direction of relative translation of said members, and
means for controllably adjusting said gib longitudinally in said slot,
said rollers being slightly flexible radially of their axes thereby to compensate for even the slightest misalignment in the assembly.

* * * * *